(12) United States Patent
Karnik et al.

(10) Patent No.: US 10,824,986 B2
(45) Date of Patent: Nov. 3, 2020

(54) AUTO-SUGGESTING IT ASSET GROUPS USING CLUSTERING TECHNIQUES

(75) Inventors: Neeran Karnik, Pune (IN); Abhay Ghaisas, Pune (IN)

(73) Assignee: BladeLogic, Inc., Houston, TX (US)

( * ) Notice: Subject to any disclaimer, the term of this patent is extended or adjusted under 35 U.S.C. 154(b) by 452 days.

(21) Appl. No.: 12/977,780

(22) Filed: Dec. 23, 2010

(65) Prior Publication Data

US 2012/0166317 A1 Jun. 28, 2012

(51) Int. Cl.
G06Q 10/08 (2012.01)

(52) U.S. Cl.
CPC .................. G06Q 10/087 (2013.01)

(58) Field of Classification Search
CPC ... G06Q 10/063; G06Q 10/087; G06K 9/6276
USPC .................. 705/28; 709/226, 220
See application file for complete search history.

(56) References Cited

U.S. PATENT DOCUMENTS

| | | | | |
|---|---|---|---|---|
| 5,440,742 | A * | 8/1995 | Schwanke ................. | G06F 8/75 717/120 |
| 6,816,848 | B1 * | 11/2004 | Hildreth et al. ................. | 706/45 |
| 6,947,959 | B1 * | 9/2005 | Gill .............................. | 715/202 |
| 7,979,513 | B2 * | 7/2011 | Garvey ................... | H04L 41/14 709/220 |
| 8,285,578 | B2 * | 10/2012 | Sheppard ..................... | 705/7.13 |
| 8,352,611 | B2 * | 1/2013 | Maddhuri ............. | G06F 9/5005 709/226 |
| 8,478,879 | B2 * | 7/2013 | Brown ..................... | G06F 16/00 709/226 |
| 8,751,283 | B2 * | 6/2014 | Bobak ................ | G06Q 10/0633 705/7.27 |
| 2003/0055749 | A1 * | 3/2003 | Carmody et al. ................ | 705/28 |
| 2004/0024644 | A1 * | 2/2004 | Gui ......................... | G06Q 10/08 705/22 |
| 2004/0236658 | A1 * | 11/2004 | Bowman ................ | G06Q 10/06 705/36 R |
| 2005/0289071 | A1 * | 12/2005 | Goin et al. ...................... | 705/56 |
| 2007/0260625 | A1 * | 11/2007 | Tien ........................ | G06Q 30/00 |
| 2008/0097731 | A1 * | 4/2008 | Lanes ................... | G06Q 10/087 703/2 |
| 2008/0288220 | A1 * | 11/2008 | Dillenberger .......... | G06Q 10/06 703/1 |
| 2009/0171740 | A1 * | 7/2009 | Eder ................... | G06Q 30/0202 705/7.12 |
| 2010/0229096 | A1 * | 9/2010 | Maiocco ................ | G06F 15/173 715/734 |
| 2010/0332475 | A1 * | 12/2010 | Birdwell ........... | G06F 17/30333 707/737 |
| 2011/0022359 | A1 * | 1/2011 | Thorat .................... | G06Q 10/00 702/186 |
| 2012/0087301 | A1 * | 4/2012 | Brandt .................. | H04W 4/043 370/328 |

(Continued)

Primary Examiner — Florian M Zeender
Assistant Examiner — Milena Racic
(74) Attorney, Agent, or Firm — Brake Hughes Bellermann LLP

(57) ABSTRACT

An information technology (IT) asset management system provides for logically grouping IT assets and performing actions on the logical groups. Cluster analysis techniques are used to analyze the configuration data corresponding to IT assets in the IT asset management system, generating proposed logical groups from the clusters determined by the cluster analysis techniques. A system administrator may be allowed to accept or reject the proposed logical groups.

13 Claims, 7 Drawing Sheets

(56) References Cited

U.S. PATENT DOCUMENTS

2013/0246422 A1* 9/2013 Bhargava et al. ............ 707/737

* cited by examiner

AUTO-SUGGESTING IT ASSET GROUPS USING CLUSTERING TECHNIQUES

BACKGROUND

This disclosure relates generally to the field of information technology (IT) asset management. More particularly, but not by way of limitation, it relates to techniques for automatically generating suggestions for logical groupings of IT assets managed by an enterprise. These IT assets may be managed using one or more IT management systems, including an asset management system, an inventory management system, a configuration management system, and an IT compliance management system.

Asset management systems are an important part of the management of the computer systems of a large enterprise. These systems provide an enterprise with the ability to manage configuration changes, providing better control over the computer software and hardware assets of the enterprise. Example asset management systems include the BMC® BLADELOGIC® Server Automation product from BMC Software, Inc. (BMC and BLADELOGIC are registered trademarks of BMC Software, Inc.)

In a large enterprise, when an asset management product is initially deployed, a large number of assets such as server, desktop, and laptop computers must first be enrolled or registered with the product as managed entities. Depending on the capabilities of the asset management system, the registration of assets may be done manually or may be automated using a discovery tool, such as the BMC Atrium Discovery and Dependency Mapping software, which automatically discovers physical and virtual assets.

The assets managed by such asset management systems are typically grouped into logical groups that may be managed collectively, reducing the complexity and costs of managing those grouped assets. However, creating logical groups of these IT assets remains a manual task. Administrators may create and populate groups with individual IT assets based on some organization-specific criteria. In some asset management systems, administrations may define groups that are automatically populated based on rules involving IT asset attributes. In either case, some administrator is responsible for defining the groups or rules manually. In large enterprises, group definition is a hard task for individual administrators, and is likely to result in false positives (an IT asset incorrectly being assigned to a group) and false negatives (an IT asset incorrectly being omitted from a group). Even where groups are automatically populated, the correctness of those groups remains dependent on discovering and updating the right metadata or configuration data.

In addition, administrators typically create groups using simple criteria of which they are aware, e.g., operating system (OS) type or physical location. Other possible groupings, which may be more useful in some scenarios, may not be created because the administrator is unable to determine the proper criteria for defining the group. For example, the administrator may not be aware of which attributes are key to similarity among assets of a given type or there may not be any simple expression involving IT asset attributes that can be used to define a desired group.

When IT asset management systems managed hundreds of IT assets, these manual groupings, while onerous, may have been feasible. Today, however, where such systems may be managing tens of thousands of IT assets, manual grouping is at best very difficult, and often infeasible with any degree of accuracy.

Thus, IT asset management systems have frequently produced suboptimal groups.

SUMMARY

In one embodiment, a method is disclosed. The method comprises registering a plurality of information technology assets of an enterprise in a computerized information technology asset management system; performing cluster analysis on configuration data corresponding to the plurality of information technology assets, generating a plurality of clusters of information technology assets; and adding a cluster of the plurality of clusters of information technology assets as a logical group in the information technology asset management system.

In another embodiment, a computer readable medium is disclosed. The computer readable medium has instructions for a programmable control device stored thereon wherein the instructions cause the programmable control device to perform the method described above.

In yet another embodiment, a networked computer system is disclosed. The networked computer system comprises a plurality of computers communicatively coupled, at least one of the plurality of computers programmed to perform at least a portion of the method of described above wherein the entire method described above is performed collectively by the plurality of computers.

In yet another embodiment, a computerized information technology asset management system is disclosed. The computerized information technology asset management system comprises a database of information technology asset configuration data, entries in which comprise a plurality of attributes of information technology assets; a processor, coupled to the database of information technology assets; a program storage unit, coupled to the processor; and software, stored in the program storage unit, comprising instructions that when executed by the processor cause the processor to perform actions. The actions comprise selecting a plurality of configuration data corresponding to a plurality of information technology assets; performing cluster analysis on the plurality of configuration data, generating a plurality of clusters of information technology assets; and adding a logical group to the information technology management system corresponding to a first cluster of the plurality of clusters of information technology assets.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term database should be understood to include any form of storing data for an intended use and is not limited to relational databases managed by a relational database management system and accessed using a structured query language (SQL) interface, although such relational databases may be used. A database may also be implemented in other ways, including flat files and object-oriented database systems. In addition, the terms table, rows, and columns should not be understood as implying any specific implementation or data structures.

Figure 1:
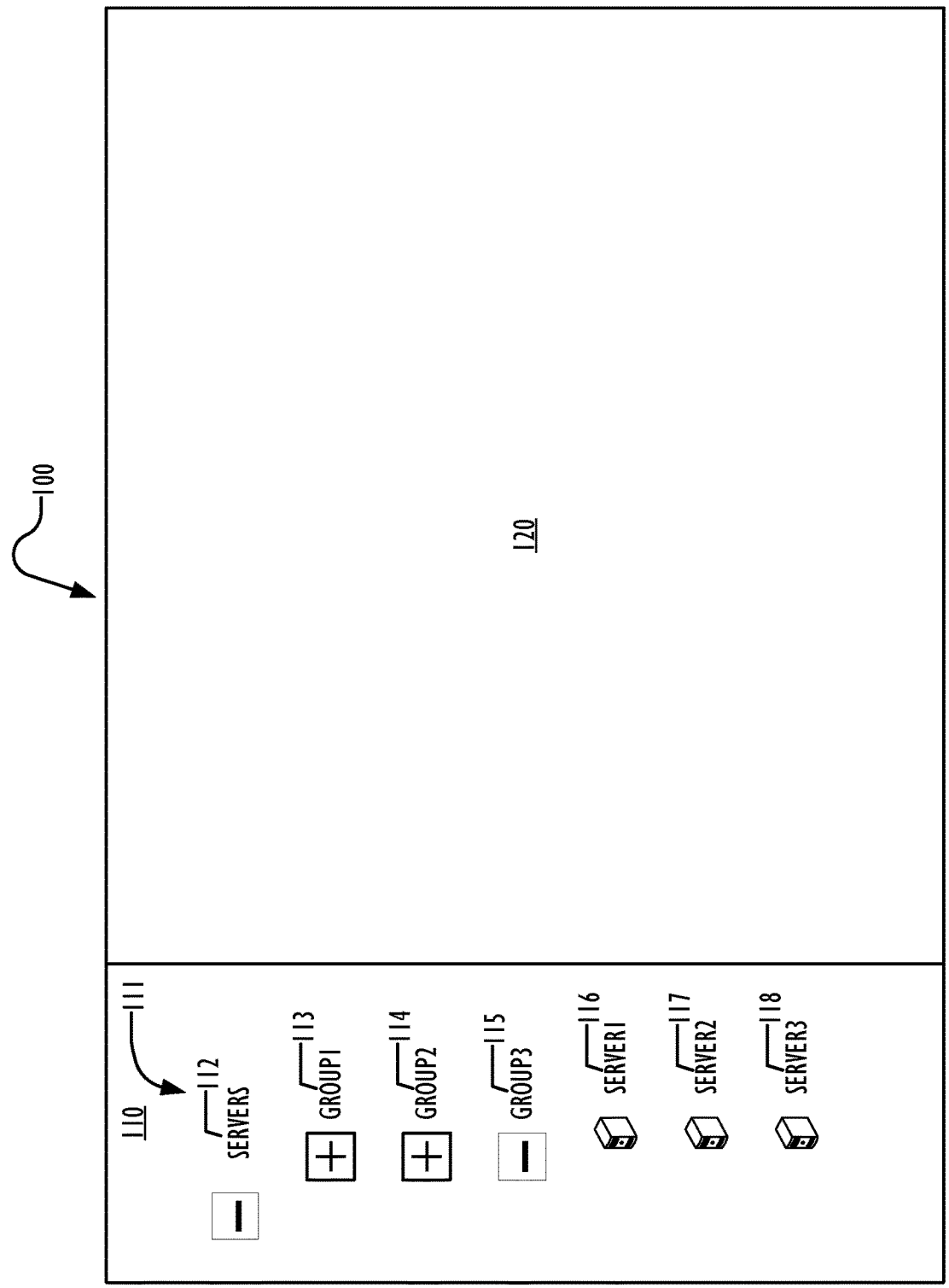
FIG. 1 illustrates, in block diagram form, an example of a display of an IT asset management system according to the prior art.

FIG. 1 is a block diagram illustrating a display of an IT asset management system 100 according to the prior art. For purposes of this disclosure, an IT asset management system includes any IT system that manages IT assets, including an asset management system, an inventory management system, a configuration management system, and an IT compliance management system.

In this system, the display is divided into two panels 110 and 120. Panel 110 provides a tree of IT assets for management by an administrator, with management functionality displayed in panel 120. In this example, tree 111 comprises a collection of servers 112, grouped into three logical groups 113, 114, and 115. Group 115 comprises three servers 116, 117, and 118. An administrator may wish to perform management functions on an individual server (for example, server 116) or in many instances, perform management functions on all of the servers in a group of servers (for example group 115). Servers are used in FIG. 1 as an example only, and the techniques described below are not limited to management of IT server assets.

Although an IT infrastructure of the size illustrated in FIG. 1 may be small enough for administrator to define the groups 113, 114, and 115, in an IT infrastructure of tens of thousands of servers, manual definition is extremely laborious and difficult. The techniques described below allow an IT asset management system according to various embodiments to propose logical groupings using cluster analysis techniques, without an administrator having to determine the membership of the groups manually.

By applying cluster analysis techniques, appropriate logical groups of IT assets may be automatically discovered and suggested to administrators. These cluster analysis techniques may discover groups that are more optimal than would be manually defined by the administrator, based on some combination of configuration attributes, including combinations that may not be suspected by the administrator as useful, or by excluding attributes that analysis determines not to be useful in defining logical groups.

In one embodiment, the IT asset management system may automatically define the logical groups as result of the cluster analysis. In another embodiment, the IT asset management system may suggest logical group definitions to an administrator, allowing the administrator to accept or reject each suggested group definition and creating accepted logical groups in the IT asset management system.

Figure 2:
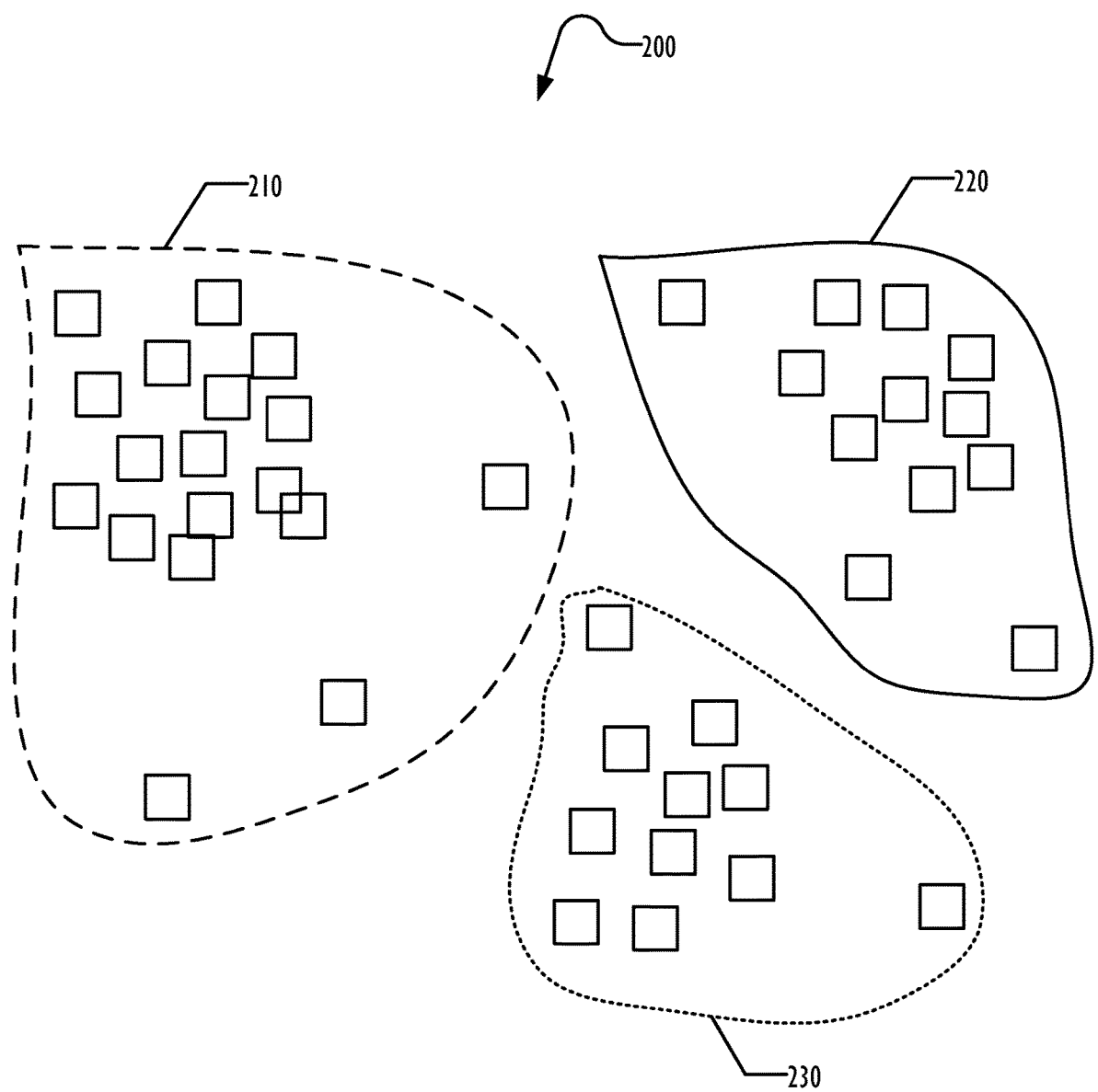
FIG. 2 illustrates, in block diagram form, an example of clustering observations according to one embodiment.

FIG. 2 is an illustration of the result of a cluster analysis of a collection of items 200 according to one embodiment. Using a selected clustering technique, the items 200 are clustered into three clusters 210, 220, and 230. In this example, the items 200 were clustered using a distance-based clustering technique in which a given distance between items is used to determine the membership of the clusters. The most common distance in a two-dimensional data space uses a simple Euclidean geometric distance measure. For higher dimensional data, such as the n-dimensional configuration data, a Minkowski distance metric may be used, in which the distance $d_p$ between two points $x_i$ and $x_j$ is determined by the following equation:

$$d_p(x_i,x_j)=(\Sigma_{k=1}^{n}|x_{i,k}-x_{j,k}|^p)^{1/p}$$

where n is the number of dimensions in the data, and p is the order of the distance, typically having a value of 1 (the Manhattan distance) or 2 (the Euclidean distance), although other nonzero values of p may be used, including infinity (the Chebyshev distance).

Other distance metrics may be used, including Mahalanobis distance metrics. The choice of distance metric may affect the shape of the clusters identified in the cluster analysis.

Figure 3:
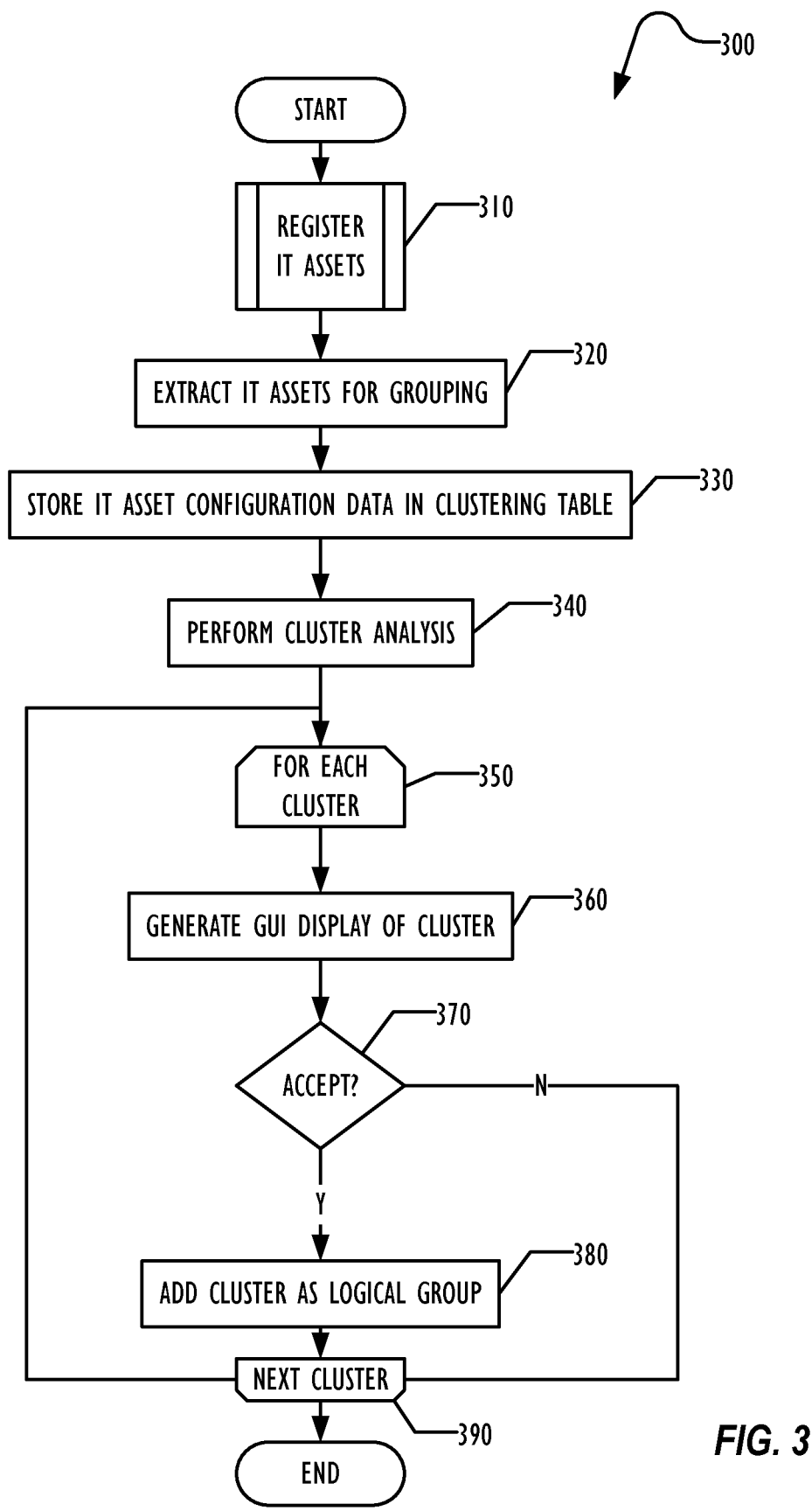
FIG. 3 illustrates, in flowchart form, a technique for performing logical grouping of IT assets in an IT asset management system according to one embodiment.

FIG. 3 is a flowchart illustrating a technique for using cluster analysis in an IT asset management system according to one embodiment. In block 310, each of the IT assets to be managed by the IT asset management system is registered with the system, providing configuration data for the asset to the system that is stored in one or more databases of the system. Registration of the assets for purposes of this disclosure includes any technique for acquiring the configuration data, and may be referred to using various names in different embodiments, including registration, discovery, importation, or uploading of configuration data, depending on the techniques used for obtaining or finding the configuration data.

In block 320, the IT assets that are to be grouped are extracted from the IT asset management database and in block 330, their corresponding configuration data are stored in a temporary database in a clustering table as described in more detail below. Then in blocks 350-390, for each cluster discovered by the cluster analysis, a graphical display of the cluster is generated and displayed to the administrator in block 360. If the administrator indicates acceptance of the group in block 370, then in block 380 the logical group is created in the IT asset management system, before moving onto the next cluster in block 390. In one embodiment, as part of creating the logical group, the administrator may assign a human-readable name to the logical group. In other embodiments, the IT asset management system may automatically create a name for the logical group.

Figure 4:
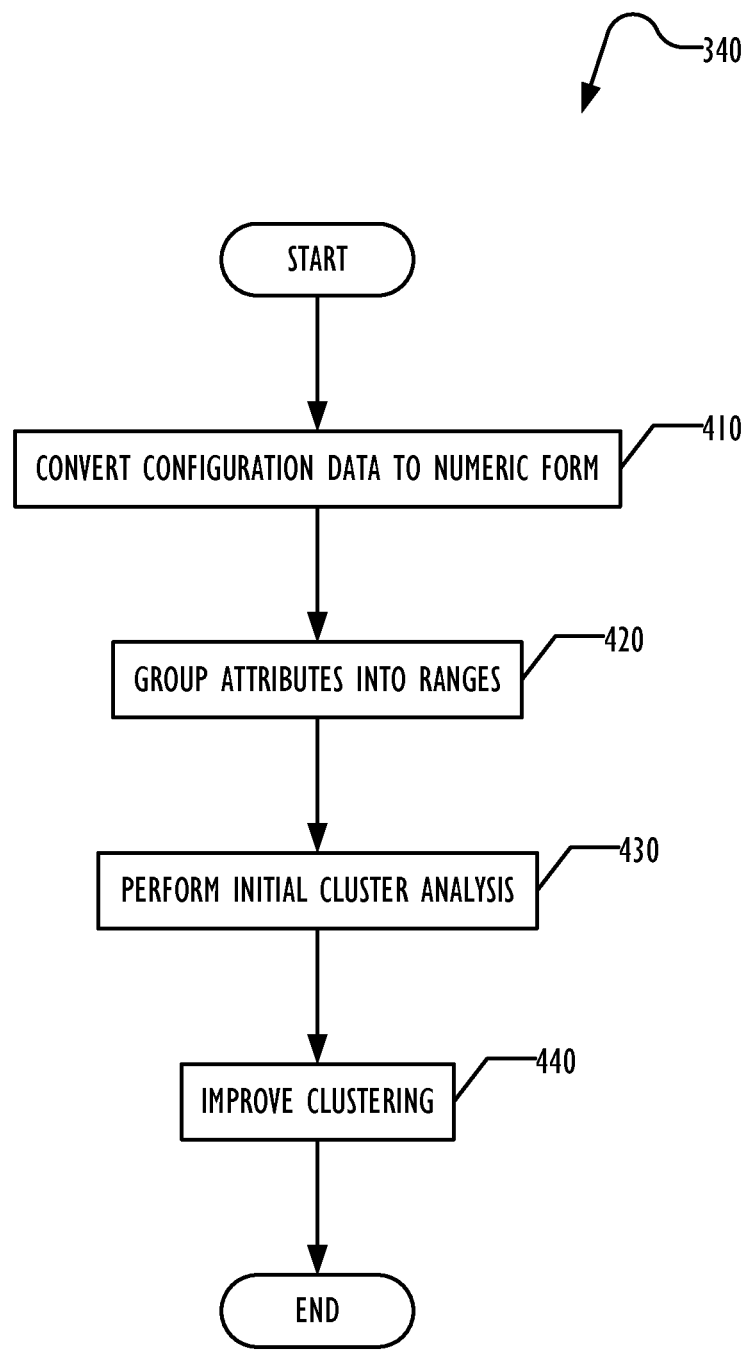
FIG. 4 illustrates, in flowchart form, a technique for performing clustering of IT asset management configuration data according to one embodiment.

FIG. 4 is a flowchart illustrating a technique for performing the cluster analysis of block 340 according to one embodiment. In block 410, the configuration data is converted to numeric form, as described in more detail below. In block 420, certain attributes may be grouped into ranges, to allow performing cluster analysis on the ranges as described in more detail below. Then in block 430, an initial cluster analysis is performed on the configuration data, using the clustering algorithm used by the IT asset management system. In some embodiments, the IT asset management system may use different clustering algorithms for different classes of IT assets. After the initial clustering is done, then in block 440 the clustering may be improved as described in more detail below, by eliminating variables or factors that do not materially contribute to the calculation of good clusters.

Figure 5:
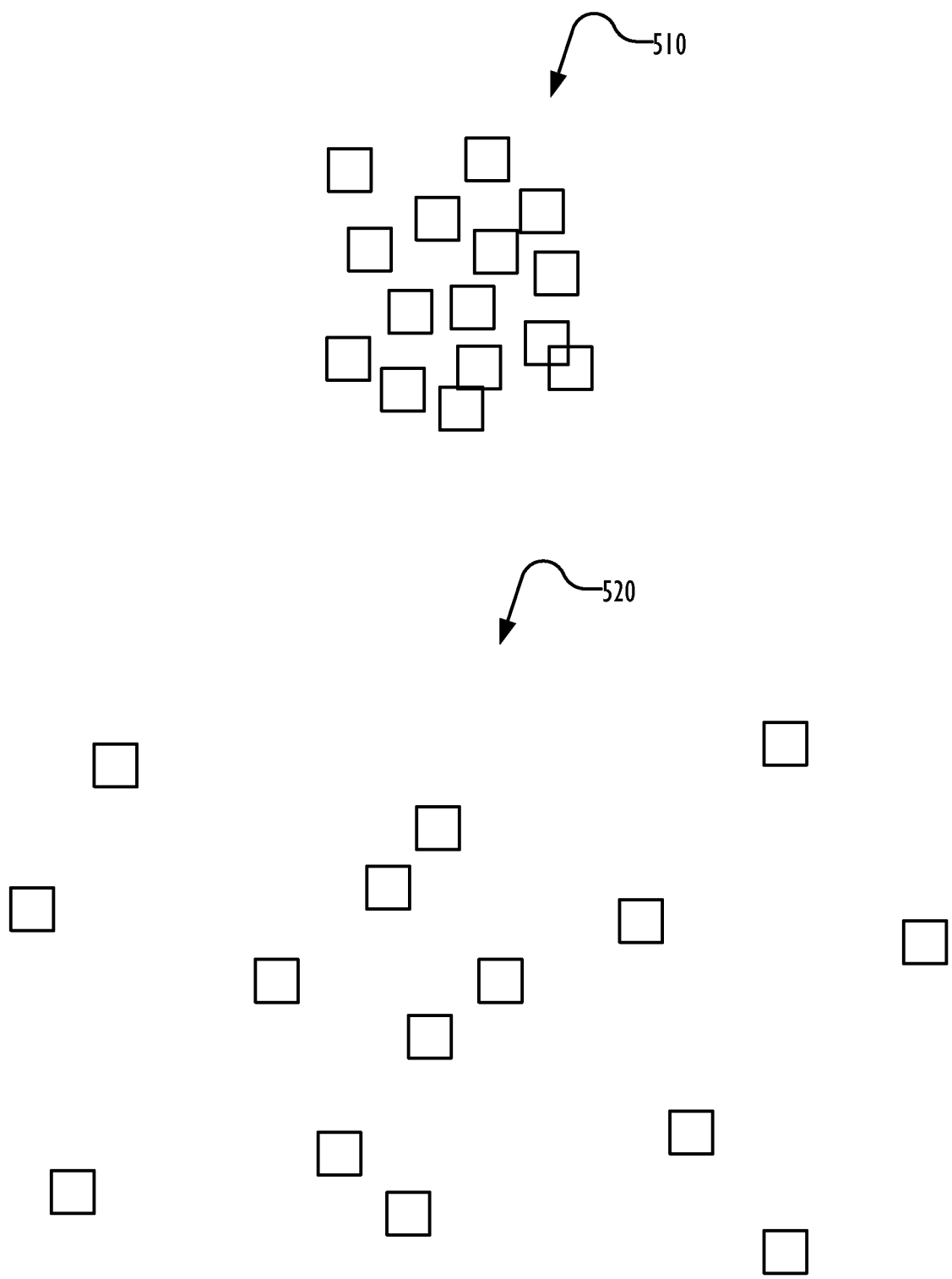
FIG. 5 illustrates, in block diagram form, two examples of clusters proposed as logical groups by the technique of FIGS. 3 and 4.

FIG. 5 is a block diagram illustrating two examples of clusters that may be presented to the administrator for acceptance or rejection according to one embodiment. Cluster 510 illustrates a cluster with a number of closely spaced members. Cluster 520 illustrates a cluster in which the members are more spread out than in cluster 510. Both clusters 510 and 520 may be useful logical groupings of IT assets in the IT asset management system, but cluster 520 suggests a logical grouping where the level of similarity between the items may be significantly less than the level of similarity between the members of cluster 510. An administrator may look upon the cluster 510 as clearly reflecting similarity, but may be suspicious of the logical group suggested by the IT asset management system in cluster 520. The graphical representation is a projection into two dimensions of the points in the n-dimensional space that correspond to the members of the cluster detected by the cluster analysis, with the distances between the squares representing the distance in the n-dimensional space of the members. The closer the squares, the more similar the cluster analysis considers the IT assets, based on the configuration data attributes that were used for clustering.

In one embodiment, each cluster is presented separately for acceptance or rejection by the administrator. In another embodiment, the GUI of the IT asset management system may present multiple clusters, allowing the administrator to accept or reject each cluster singly or together with other clusters. To assist the administrator in making a good decision regarding acceptance of the proposed logical groups, the IT asset management system may provide additional information related to each proposed group, such as the underlying configuration data elements corresponding to the members of the cluster, to help the administrator have confidence in the proposed logical grouping. In one embodiment, the additional information may be displayed in the GUI by default, without requiring the administrator to request a display of the additional information. In another embodiment, the GUI may display only the graphical representation of the cluster by default, and may display the additional information upon request by the administrator.

In one embodiment, information corresponding to the cluster may also be provided to the administrator, such as information regarding the density of the cluster, the n-dimensional distances between pairs of elements. Other types of information may be provided as desired, including information comparing the cluster currently being considered by the administrator with other clusters that have been accepted by the administrator and created as logical groups in the IT asset management system. The administrator is not required to have any knowledge of the clustering technique used by the IT asset management system, or any detailed knowledge of clustering techniques in general.

There are numerous techniques for performing cluster analysis, and embodiments may be implemented using any desired clustering techniques, including agglomerative or divisive hierarchical clustering, partitional clustering, density-based clustering, and spectral clustering. Because the number of clusters in the IT asset configuration data is typically not known in advance, clustering techniques that do not depend upon prior knowledge of a desired number of clusters are preferably used.

Some clustering techniques may produce different results depending upon clustering parameters that are specific to the clustering algorithm or that may be related to more than one clustering technique. In one embodiment, an administrator may be able to accept or modify such clustering parameters if desired. Typically, however, administrators may allow the clustering technique to use predefined default clustering parameters, and some embodiments may not allow administrator control over those parameters. One embodiment may allow administrator selection between multiple clustering algorithms.

As indicated above, the configuration data used for the cluster analysis is typically already available in the IT asset management system, having been collected when the IT asset was registered with the IT asset management system. The configuration data may include any attributes deemed useful by the IT asset management system. For servers, for example, the configuration data may include the number of processors, the processor speed, the amount of physical memory, the manufacturer name, the OS (and OS version), the host name, the IP address, etc. These configuration attributes are illustrative and by way of example only, and other configuration data attributes may be used as desired.

In one embodiment, the configuration data to be used for the cluster analysis may be extracted from the IT asset management system database or databases and used to populate a temporary cluster analysis database table, with each row of the table corresponding to one IT asset. This table may be implemented in an existing database or as a separate database specific to the cluster analysis.

The configuration data stored in the table is preferably converted as necessary to a numeric form. This conversion may be performed in various embodiments either prior to storing the data in the table or after the table is populated, as desired or convenient.

The conversion to numeric form may be done in multiple ways, including different types of conversions depending upon the nature of the nonnumeric data being converted to numeric form. For example, a list of manufacturers names may be created, each with an associated numeric value, and the conversion performed as a lookup into this list of manufacturer names and numeric values. In another example, the IP address can be converted from xxx.xxx.xxx.xxx form into a 32-bit unsigned integer using well-known techniques.

In one embodiment, the resulting numeric values may be normalized or scaled into a desired scaling relationship. In another embodiment, the numeric values are unscaled. In one embodiment, numeric values, including values converted from non-numeric data, may be grouped into ranges and the numeric value corresponding to the range used for clustering, instead of the original individual numeric values. For example, instead of using the actual amount of physical memory associated with a server, clustering based on low, medium, and high memory sizes may be more useful. Thus, servers with 1-4 GB of memory may be classed as low, servers with 5-15 GB of memory may be classes medium, and servers with 16 GB or more of memory may be classed as high, using values of 1 (low), 2 (medium), or 3 (high) for clustering instead of using the actual memory size. The memory size ranges described above are illustrative and by way of example only, and different ranges and numbers of ranges may be used. In another example, the IP address data may be grouped by subnets, and the clustering performed on a numeric value corresponding to each subnet, instead of performing clustering on the individual IP addresses. In one embodiment, instead of using predefined groupings or ranges of values, the system may analyze the values for an attribute associated with all of the IT assets to be clustered to derive the ranges and number of ranges to use for that attribute, assigning a numeric value to each derived range.

The numeric data for each IT asset defines a point in an n-dimensional space, where n is the number of configuration data attributes used for clustering. In one embodiment, different types of IT assets may have different numbers of configuration data attributes, thus the dimensionality of the data for different types of IT assets may differ. In one embodiment, the grouping technique may use a subset of the available configuration attributes, selected from the attributes collected at the registration of the IT asset. In another embodiment, all of the collected configuration data may be used. Different types of IT assets may have different selections of attributes, with some types of IT assets using all of the configuration data for grouping purposes, and other types of IT assets using only a selected subset of the configuration data. In one embodiment, an administrator may select the configuration data attributes to use for clustering each type of IT asset.

Performing cluster analysis on the numeric values thus becomes a matter of identifying clusters of points in the n-dimensional space defined by the n configuration data attributes.

Cluster analysis or clustering is the assignment of a set of objects or observations into subsets (known as clusters) so that objects in the same cluster are similar in some sense. Clustering is a common technique for statistical data analysis used in many fields, but has not previously been used in IT asset management systems.

Once the cluster analysis has identified clusters in the configuration data, the clusters may be rendered in a form that lets the administrator approve and accept the proposed logical groupings. In one embodiment, the groupings may be presented in a non-graphical report format. In another embodiment, the groupings may be rendered in a graphical user interface (GUI) that displays clusters graphically.

In one embodiment, the GUI may display a proposed logical grouping of IT assets as a graph, displaying the n-dimensional distance measure between points in the graph. In another embodiment, the GUI may display the configuration data attributes for the items in the cluster in a tabular or other convenient form. Other embodiments for displaying the cluster may be used, including combinations of the embodiments described above. Any additional information may be displayed that may assist the administrator in deciding whether the logical grouping suggested by the cluster analysis is appropriate.

In addition to displaying the proposed logical groupings in a GUI, one embodiment may allow the administrator to accept or reject the proposed logical groupings. Upon acceptance by the administrator, the system may automatically create a logical group of IT assets in the IT asset management system and pre-populate the group with the members of the cluster as accepted by the administrator. If the group suggested by the cluster analysis is rejected by the administrator, the group is not added to the IT asset management system. In one embodiment, in addition to creating logical groups as suggested by the cluster analysis, the administrator may be given an opportunity to define additional groups not suggested by the cluster analysis, using additional domain knowledge possessed by the administrator.

Some of the configuration data attributes may be useful for defining logical groups and some attributes may contribute little to the clustering. In such a situation, the dimensionality of the configuration data may be reduced by omitting those attributes that contribute little to the clustering. However, neither the system nor the administrator may have prior knowledge of which configuration data attributes materially contribute to the clustering.

In one embodiment, the IT asset management system initially performs the clustering with all of the configuration data attributes. The system then may attempt to reduce the dimensionality of the data by iteratively performing the cluster analysis, each time omitting one or more of the configuration data attributes. Statistical analysis of the resulting clusters may then be performed and compared to a statistical analysis of the previous iteration. If the resulting clusters are statistically better than those produced previously, then that attribute may be dropped from the analysis, because it did not materially contribute to the similarity of the members of the clusters. In one embodiment, the system automatically decides which attribute or attributes to remove from the next iteration. In another embodiment, the administrator may be allowed to choose which attribute or attributes to remove from the next iteration.

Any statistical measurement known to the art may be used to evaluate the clustering results, including cluster cohesiveness and semantic cohesiveness measures. By comparing the results of the clustering using these statistical measures, after several iterations the IT asset management system may be able to eliminate the attributes that do not contribute materially to the clustering.

In another embodiment, factor analysis techniques known to the clustering arts may be used to discover the factors or latent variables that result in joint variability of the configuration attributes. Latent variables are not configuration attributes entered into the IT asset management system, but are inferred through mathematical models from those attributes. In some cases, latent variables correspond to configuration attributes that have physical reality, but which may not be captured for practical or other reasons. Alternately, the latent variables may correspond to abstractions, like categories, that do not have physical reality. Latent variables generally represent a shared variance, or the degree in which a variance in one variable correlates to a variance in another variable. For example, in computer servers, units with more processors may also tend to have more physical memory, thus a latent variable may effectively combine those two variables and could be used for clustering instead of the two separate attributes, reducing the dimensionality of the clustering.

By using factor analysis techniques known to the art to reduce the dimensionality of the cluster analysis, the administrator may be presented with discovered groupings that are grouped better, and the system may increase the confidence level of the administrator, making verification that the system has proposed appropriate logical groups easier for the administrator.

Figure 6:
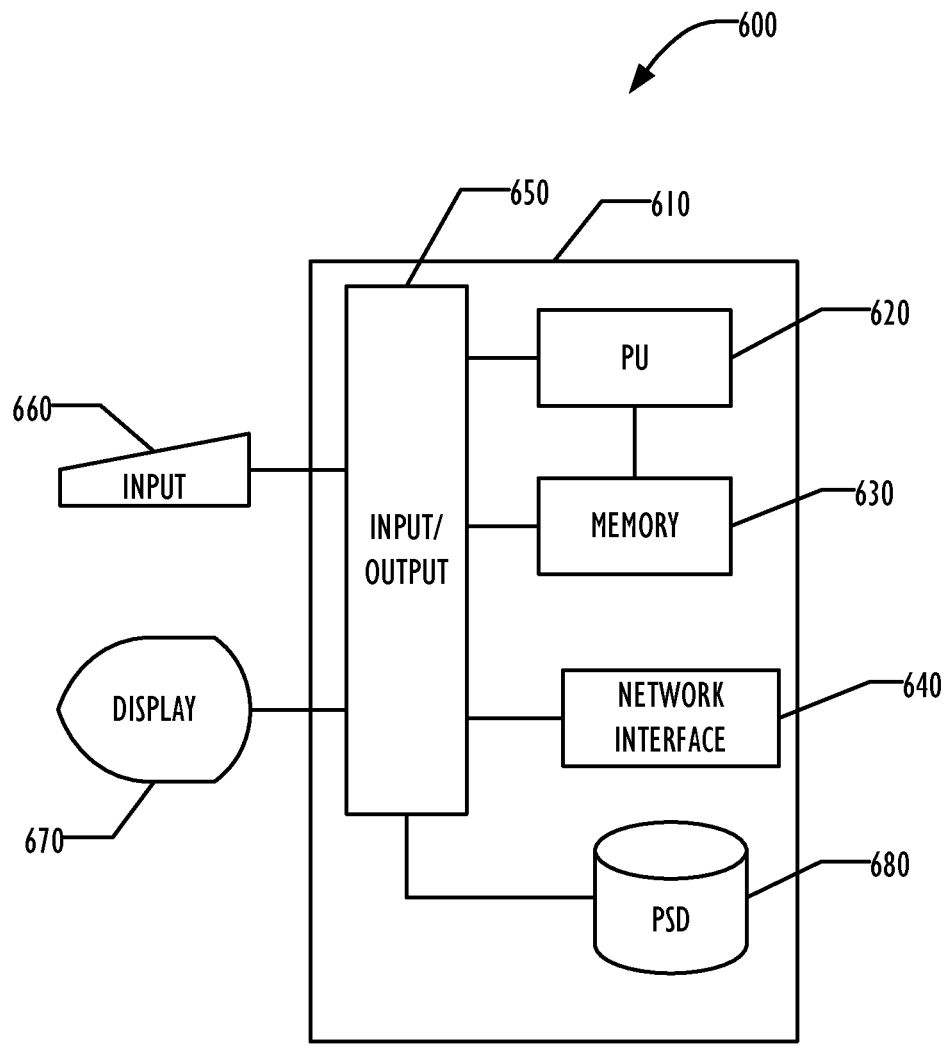
FIG. 6 illustrates, in block diagram form, a computing device for performing the technique of FIGS. 3 and 4 according to one embodiment.

Referring now to FIG. 6, an example computer 600 for use in providing an IT asset management system is illustrated in block diagram form. Example computer 600 comprises a system unit 610 which may be optionally connected to an input device or system 660 (e.g., keyboard, mouse, touch screen, etc.) and display 670. A program storage device (PSD) 680 (sometimes referred to as a hard disc) is included with the system unit 610. Also included with system unit 610 is a network interface 640 for communication via a network with other computing and corporate infrastructure devices (not shown). Network interface 640 may be included within system unit 610 or be external to system unit 610. In either case, system unit 610 will be communicatively coupled to network interface 640. Program storage device 680 represents any form of nonvolatile storage including, but not limited to, all forms of optical and magnetic, including solid-state, storage elements, including removable media, and may be included within system unit 610 or be external to system unit 610. Program storage device 680 may be used for storage of software to control system unit 610, data for use by the computer 600, or both.

System unit 610 may be programmed to perform methods in accordance with this disclosure (an example of which is in FIG. 3). System unit 610 comprises a processor unit (PU) 620, input-output (I/O) interface 650 and memory 630. Processing unit 620 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory.

Figure 7:
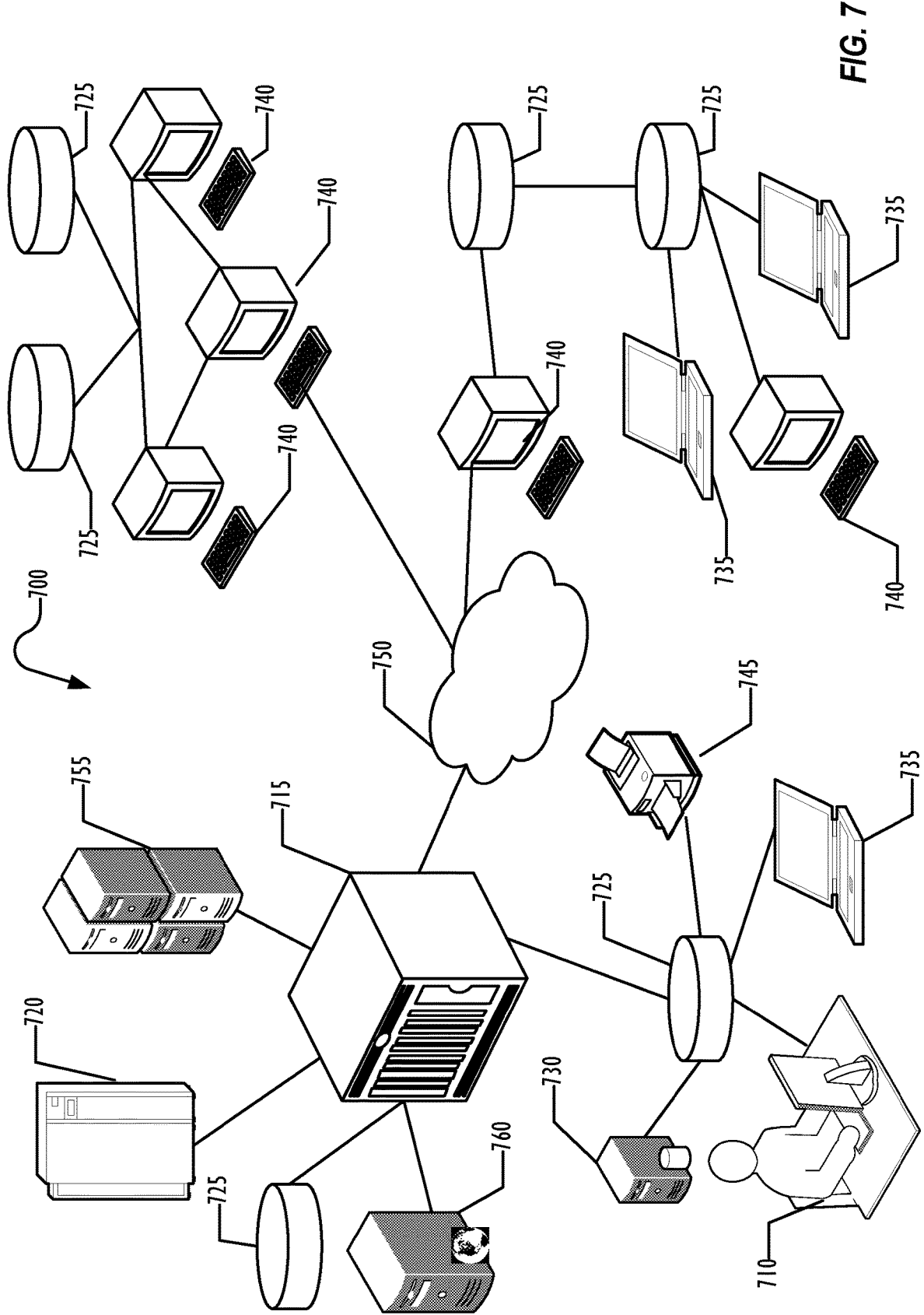
FIG. 7 illustrates, in block diagram form, an IT infrastructure that includes elements that provide an IT asset management system according to one embodiment.

FIG. 7 is a block diagram illustrating an IT infrastructure 700 that may include elements that provide IT asset management systems using clustering techniques as disclosed above. A user 710 may use a terminal or workstation to access IT asset management software to administer IT assets on a display associated with the workstation. The software clustering the IT assets and generating the GUI for the IT asset management system may display the graphical elements on the user's workstation display 710, including the proposed logical groupings, and may execute on the workstation for the user 710 or on other computing resources of the IT infrastructure 700, such as a mainframe 720, a web server 760, a database server 730, an application server 755, and other workstations 740, laptops 735. The IT infrastructure 700 may include one or more databases 725 that store data related to the IT asset management system corresponding to the organizational elements, services, IT hardware, and IT software that are modeled by that system. The IT infrastructure may further include other IT resources, such as a printer 745. The IT infrastructure may be connected in any way known to the art, including using switches or routers 715 and networks 750.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   registering a plurality of information technology assets in a computerized asset management system, the plurality of information technology assets being physical information technology assets;
   storing at least one configuration data variable for each of the plurality of information technology assets, an attribute of the at least one configuration data variable identifying a location of each one of the plurality of information technology assets;
   converting the at least one configuration data variable for each of the plurality of information technology assets into a set of numerical values, the one or more attributes associated with the at least one configuration data variables identifying a location of the information technology assets;
   performing a first cluster analysis on the plurality of information technology assets, the first cluster analysis using a distance algorithm with at least one first set of variables selected from the numerical values as an input, the first cluster analysis using the distance algorithm to compare a closeness of at least two of the plurality of information technology assets to each other based on the at least one first set of variables;
   performing a second cluster analysis on the plurality of information technology assets, the second cluster analysis using the distance algorithm with at least one second set of variables selected from the numerical values as an input, the second cluster analysis using the distance algorithm to compare a closeness of the at least two of the plurality of information technology assets to each other based on the at least one second set of variables;
   generating a plurality of clusters of information technology assets based on a comparison of a result of the first cluster analysis and a result of the second cluster analysis, each of the plurality of clusters of information technology assets including technology assets having similar configuration data;
   rendering a graphical representation for each of the plurality of clusters of information technology assets in a graphical user interface (GUI), the graphical representation visually indicating a similarity of the information technology assets within each of the plurality of clusters based on spacing between points in the graphical representation;
   enabling in the GUI a selection of the graphical representation;
   in response to the selection of the graphical representation, automatically creating a logical group of information technology assets in the asset management system; and
   pre-populating the logical group with the information technology assets from the cluster represented by the selection.

2. The method of claim 1, wherein the rendering the graphical representation comprises:
   displaying the configuration data corresponding to each of the plurality of clusters of information technology assets in the GUI.

3. The method of claim 1, wherein every cluster of the plurality of clusters is added as a logical group in the asset management system without user intervention.

4. The method of claim 1, wherein the generating of the set of numerical values includes:
defining a plurality of ranges of an attribute of the configuration data; and
associating a numeric value corresponding to at least one numeric variable with each of the plurality of ranges of the attribute of the configuration data.

5. The method of claim 4, wherein the defining of the plurality of ranges of the attribute of the configuration data is performed based on a converted numeric form of the configuration data for each of the plurality of information technology assets.

6. The method of claim 1, wherein the comparison of the result of the first cluster analysis and the result of the second cluster analysis compares a cohesiveness of the at least one first set of variables and a cohesiveness of the at least one second set of variables.

7. The method of claim 1, further comprising:
performing a factor analysis on the configuration data; and
re-performing the cluster analysis on the configuration data responsive to the factor analysis.

8. The method of claim 1, wherein the performing of the cluster analysis on the configuration data corresponding to the plurality of information technology assets comprises:
selecting a first cluster analysis technique from a plurality of cluster analysis techniques; and
performing the first cluster analysis technique on the configuration data.

9. The method of claim 8, wherein the selecting of the first cluster analysis technique from the plurality of cluster analysis techniques is performed responsive to a classification of the information technology assets.

10. The method of claim 8, wherein the selecting of the first cluster analysis technique from the plurality of cluster analysis techniques comprises:
requesting an instruction from a system administrator; and
selecting the first cluster analysis technique responsive to the instruction.

11. A non-transitory computer readable medium with instructions for a programmable control device stored thereon wherein the instructions cause a programmable control device to,
register a plurality of information technology assets in a computerized asset management system, the plurality of information technology assets being physical information technology assets;
store at least one configuration data variable for each of the plurality of information technology assets, an attribute of the at least one configuration data variable identifying a location of at least one of the plurality of information technology assets;
convert the at least one configuration data variable for each of the plurality of information technology assets into a set of numerical values;
perform a first cluster analysis on the plurality of information technology assets, the first cluster analysis using a distance algorithm with at least one first set of variables selected from the numerical values as an input, the first cluster analysis using the distance algorithm to compare a closeness of at least two of the plurality of information technology assets to each other based on the at least one first set of variables;
perform a second cluster analysis on the plurality of information technology assets, the second cluster analysis using the distance algorithm with at least one second set of variables selected from the numerical values as an input, the second cluster analysis using the distance algorithm to compare a closeness of the at least two of the plurality of information technology assets to each other based on the at least one second set of variables;
generate a plurality of clusters of information technology assets based on a comparison of a result of the first cluster analysis and a result of the second cluster analysis, each of the plurality of clusters of information technology assets including technology assets having similar configuration data;
render a graphical representation for each of the plurality of clusters of information technology assets in a graphical user interface (GUI), the graphical representation visually indicating a similarity of the information technology assets within each of the plurality of clusters based on spacing between points in the graphical representation;
enable in the GUI a selection of the graphical representation;
in response to the selection of the graphical representation, automatically create a logical group of information technology assets in the asset management system; and
pre-populate the logical group with the information technology assets from the cluster represented by the selection.

12. A computerized asset management system, comprising:
a database storing a plurality of entries associated with information technology assets, the information technology assets being physical information technology assets, each entry including:
configuration data associated with a corresponding information technology asset,
at least one configuration data variable associated with the corresponding information technology asset, and
at least one attribute associated with the at least one configuration data variable, an attribute of the at least one attribute identifying a location of an information technology asset;
a processor, coupled to the database;
a program storage unit, coupled to the processor; and
software, stored in the program storage unit, comprising instructions that when executed by the processor cause the processor to perform actions, comprising:
selecting a plurality of configuration data corresponding to a plurality of information technology assets from the database;
converting the at least one configuration data variables for each of the plurality of information technology assets into a set of numerical values;
performing a first cluster analysis on the plurality of information technology assets, the first cluster analysis using a distance algorithm with at least one first set of variables selected from the numerical values as an input, the first cluster analysis using the distance algorithm to compare a closeness of at least two of the plurality of information technology assets to each other based on the at least one first set of variables;
performing a second cluster analysis on the plurality of information technology assets, the second cluster analysis using the distance algorithm with at least one second set of variables selected from the numerical values as an input, the second cluster analysis using the distance algorithm to compare a closeness of the at least two of the plurality of information technology assets to each other based on the at least one second set of variables;

generating a plurality of clusters of information technology assets based on a comparison of a result of the first cluster analysis and a result of the second cluster analysis, each of the plurality of clusters of information technology assets including technology assets having similar configuration data;

render a graphical representation for each of the plurality of clusters of information technology assets in a graphical user interface (GUI), the graphical representation visually indicating a similarity of the information technology assets within each of the plurality of clusters based on spacing between points in the graphical representation;

enable in the GUI a selection of the graphical representation;

in response to the selection of the graphical representation, automatically create a logical group of information technology assets in the asset management system; and pre-populate the logical group with the information technology assets from the cluster represented by the selection.

13. The system of claim 12, wherein the software further comprises instructions that when executed by the processor cause the processor to perform actions comprising:

performing a factor analysis on the configuration data; and re-performing the second cluster analysis responsive to the factor analysis.

* * * * *